US009817831B2

(12) United States Patent
Williams et al.

(10) Patent No.: US 9,817,831 B2
(45) Date of Patent: Nov. 14, 2017

(54) MONETIZATION OF MULTIMEDIA QUERIES

(75) Inventors: Hugh J. Williams, Redmond, WA (US); Julia H. Farago, Seattle, WA (US); Nicholas A. Whyte, Mercer Island, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 2430 days.

(21) Appl. No.: 11/320,669

(22) Filed: Dec. 30, 2005

(65) Prior Publication Data

US 2007/0162428 A1 Jul. 12, 2007

(51) Int. Cl.
*G06Q 30/00* (2012.01)
*G06F 17/30* (2006.01)
*G06Q 30/02* (2012.01)

(52) U.S. Cl.
CPC .. *G06F 17/30056* (2013.01); *G06F 17/30058* (2013.01); *G06Q 30/02* (2013.01)

(58) Field of Classification Search
USPC .......................................................... 705/14
See application file for complete search history.

(56) References Cited

U.S. PATENT DOCUMENTS

| | | | | |
|---|---|---|---|---|
| 5,794,210 | A * | 8/1998 | Goldhaber et al. | 705/14.69 |
| 7,043,526 | B1 * | 5/2006 | Wolfe | G06F 17/30861 |
| | | | | 709/201 |
| 7,177,948 | B1 * | 2/2007 | Kraft et al. | 709/246 |
| 7,664,751 | B2 * | 2/2010 | O'Sullivan | G06F 17/3087 |
| | | | | 707/783 |
| 2002/0010757 | A1 * | 1/2002 | Granik | G06F 17/30876 |
| | | | | 709/218 |
| 2002/0069215 | A1 * | 6/2002 | Orbanes | G06F 3/0346 |
| | | | | 715/233 |
| 2003/0065805 | A1 * | 4/2003 | Barnes, Jr. | 709/231 |
| 2003/0163431 | A1 * | 8/2003 | Ginter | G06F 21/10 |
| | | | | 705/64 |
| 2003/0195802 | A1 * | 10/2003 | Hensen et al. | 705/14 |
| 2004/0085578 | A1 * | 5/2004 | Quek | G06Q 30/02 |
| | | | | 358/1.18 |
| 2005/0193016 | A1 * | 9/2005 | Seet | G06F 17/30758 |
| 2006/0184540 | A1 * | 8/2006 | Kung | G06F 17/3089 |
| 2006/0242602 | A1 * | 10/2006 | Schechter | G06F 9/4443 |
| | | | | 715/838 |
| 2006/0293951 | A1 * | 12/2006 | Patel | G06Q 30/02 |
| | | | | 705/14.1 |
| 2007/0033419 | A1 * | 2/2007 | Kocher et al. | 713/193 |

OTHER PUBLICATIONS

"How Web Advertising Works", by Marshall Brain, Feb. 18, 2005.*

* cited by examiner

*Primary Examiner* — Richard Reinhardt
(74) *Attorney, Agent, or Firm* — Shook, Hardy & Bacon L.L.P.

(57) ABSTRACT

A method to monetize multimedia queries is provided. The method includes receiving a multimedia query from a client device. In response, to the multimedia query a collection of thumbnails representing multimedia files is created. Position information for advertisement information is generated based on multimedia content included in the multimedia files. The position information specifies where the advertisement information should be displayed. Accordingly, advertisement information associated with advertisers that pay above a specified threshold is displayed with thumbnails of the multimedia content or with the actual multimedia content.

20 Claims, 6 Drawing Sheets

MONETIZATION OF MULTIMEDIA QUERIES

CROSS-REFERENCE TO RELATED APPLICATION

Not applicable.

STATEMENT REGARDING FEDERALLY SPONSORED RESEARCH OR DEVELOPMENT

Not applicable.

BACKGROUND

Currently, advertisers are able to purchase terms from search providers to have advertisements appear with a result set. Advertisers bid for search terms, and the advertiser with the highest bid is associated with the search term. In response to a query having the purchased search term, a result set having a collection of web pages that contain the purchased search term and advertisements of the advertiser that won the bid is transmitted to a client device that issued the query. Advertisements and uniform resource locators (URLs) are displayed on the client device. The client device may utilize the URLs to retrieve the web pages that are associated with the purchased search term.

United States copyright law protects various forms of expression, such as, images, video, text, and audio. Due to such protection, conventional methods for associating advertisements with search results may not be appropriate, for multimedia queries, such as image or video queries. As a result, copyright law limits the ability to monetize queries associated with multimedia searches. This may lead to lost revenue opportunities for search providers that are uncertain about their ability to monetize queries associated with multimedia searched.

SUMMARY

In an embodiment, a method to monetize multimedia queries is provided. Advertisements are displayed with multimedia files based on content included in the multimedia files. License information associated with multimedia content is accessed to determine whether an advertisement should be displayed with the multimedia content. Also, the license information includes information on where to locate the advertisement in relation to the multimedia content.

In another embodiment, when a license or license information is not available, the advertisement is separated spatially or temporally from the multimedia content. Alternatively, the quality of the multimedia content may be reduced to a specified threshold before an advertisement is displayed.

In another embodiment, advertisement treatment information may be generated to provide third parties with separation or position information for the advertisements and the multimedia content. This allows advertisements associated with advertisers that purchase terms included in multimedia queries to be displayed with multimedia content associated with the purchased terms.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments of the invention monetize multimedia queries that include terms purchased by advertisers. Multimedia content that is associated with the terms is presented to a user along with advertisements that correspond with the advertisers that purchased the terms. The advertisements may be spatially or temporally separated from a result set matching the terms of the multimedia query based on the multimedia content included in the result set. Moreover, a search provider may generate position information that specifies a preferred location for advertisements to invoke fair-use doctrine when displaying copyrighted-protected multimedia content and the advertisement. Accordingly, embodiments of the invention monetize multimedia queries by utilizing a system that renders copyright-protected multimedia content and advertisements, in response to the multimedia queries.

A system that monetizes multimedia queries may include one or more computers that have processors executing instructions associated with processing multimedia queries. The computers may include search providers and third-party providers that generate responses to multimedia queries. The responses to the multimedia queries include multimedia content, such as, images, videos, or audio files. Also, the multimedia queries may include terms that an advertiser purchased to have advertisements displayed with results, when the terms are included a multimedia query. The processors may include search engines that receive the multimedia queries and generate results based on the terms included in the multimedia queries. In an embodiment of the invention, the processors may be communicatively connected to client devices through a communication network, and the client devices may include a portable device, such as, laptops, personal digital assistants, smart phones, etc.

Figure 1:
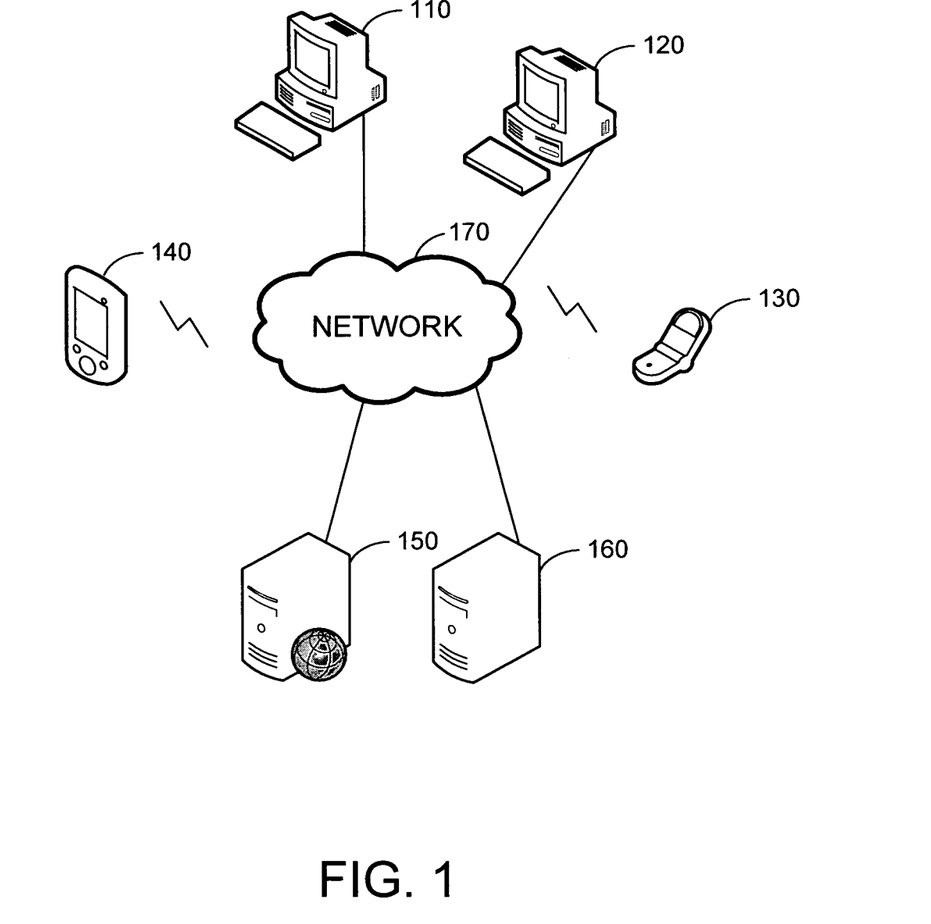
FIG. 1 is a network diagram that illustrates an exemplary computing environment, according to embodiments of the invention.

FIG. 1 is network diagram that illustrates an exemplary computing environment 100, according to embodiments of the invention. The computing environment 100 is not intended to suggest any limitation as to scope or functionality. Embodiments of the invention are operable with numerous other special purpose computing environments or configurations. With reference to FIG. 1, the computing environment 100 includes client devices 110, 120, 130, and 140, server devices 150 and 160 and a communication network 170.

The client devices 110, 120, 130 and 140 each have processing units coupled to a variety of input devices and computer-readable media via communication buses. The computer-readable media may include computer storage and communication media that are removable or non-removable and volatile or non-volatile. By way of example, and not limitation, computer storage media includes electronic storage devices, optical storages devices, magnetic storage devices, or any medium used to store information that can be accessed by client devices 110, 120, 130 and 140 and communication media may include wired and wireless media. The input devices may include, mice, keyboards, joysticks, controllers, microphones, cameras, camcorders, or any suitable device for providing user input to the client devices 110, 120, 130 and 140.

In an embodiment of the invention, the client devices 110, 120, 130 and 140 communicate with servers 150 or 160 via communication network 170. The server 150 may provides access to a search engine, and the server 160 may provide access to a third-party provider. The server 150 may generate results, based on terms specified in a multimedia query received from client devices 110, 120, 130 and 140. In an embodiment, the results generated by the server 150 may include multimedia content, such as, video, audio and image files. The results may be represented by a collection of thumbnails that represent the multimedia content that matches the multimedia query. Also, the server 160 may receive multimedia queries from the client devices 110, 120, 130 and 140. However, server 160 utilizes server 150 to generate the appropriate results. The server 150 communicates with server 160 and transmits results that include advertisements and advertisement treatment information in a communication packet. The server 160 receives the communication packet and responds to the multimedia queries. In an embodiment of the invention, the advertisements may include, but are not limited to text, banners, thumbnails, embedded video audio, text, or images, and pop-ups.

Additionally, the client devices 110, 120, 130 and 140 may store application programs that provide computer-readable instructions to implement various heuristics Multimedia queries may be formulated by using applications stored on the client devices 110, 120, 130 and 140. Client devices 110 and 120 may be desktop computers, where a user utilizes a browser application to connect to the server 150 or 160 that processes the multimedia queries. Also, the client devices 130 or 140 may be portable devices that utilize mobile-browser applications that enable mobile devices to wirelessly communicate through wireless access points. Accordingly, the client devices 130 and 140 may wirelessly connect to server 150 or 160, where a multimedia query generated by the mobile-browser application is processed to generate a result set including advertisement information. In an embodiment of the invention, the advertisement information is generated based on the multimedia content that matches the multimedia query, and the terms included in the multimedia query.

The communication network 170 may be a local area network, a wide area network, satellite network, wireless network or the Internet. The client devices 110, 120, 130 and 140 may include laptops, smart phones, personal digital assistants, or desktop computers. The client devices 110, 120, 130 and 140 utilize the communication network 170 to communicate with the server 150 or 160. The server 150 or 160 receives communications from the client devices 110, 120, 130 and 140 and processes the communications to generate advertisement and result sets that may include thumbnails of multimedia content. The computing environment 100 illustrated in FIG. 1 is exemplary and other configurations are within the scope of the invention.

A multimedia query may be initiated by a client device to locate multimedia content, such as, images, audio or video files. The multimedia query may include on or more terms that are associated with the multimedia content. The multimedia query is transmitted to a server that generates a results set having multimedia content that matches the multimedia query. In an embodiment, the multimedia content may include unlicensed copyright-protected, licensed copyrighted-protected multimedia content or public-domain multimedia content. In an another embodiment of the invention, when the status of the copyright-protection afforded to the multimedia content is uncertain, a default status assigned to the multimedia content is unlicensed copyright-protected.

When the server is licensed to display advertisements with the copyright-protected multimedia content, the results set may include advertisements along with the licensed copyright-protected multimedia content. The licensed copyright-protected multimedia content may be associated with license information that indicates where an advertisement should displayed in relation to the copyright-protected multimedia content. The license may specify that the advertisement should be embedded or superimposed on the copyright-protected multimedia content. The licensed copyright-protected multimedia content may be premium content when the server is allowed to transmit high-quality representations of the copyright-protected multimedia content along with the advertisements.

When the multimedia content includes copyright-protected multimedia content that is not associated with a license, the server may generate advertisement-treatment information that includes position or "blank space" separation information that defines spatial or temporal relationships between the advertisements and the unlicensed copyright-protected multimedia content included in the result set. "Blank space" is defined as displayed pixels that have a color and texture that is substantially similar to the color and texture of the majority of the background for the displayed page. The multimedia query may be monetized when the advertisers purchase terms from the server to have advertisements associated with results having multimedia content. Accordingly, the server may utilize advertisement-treatment information to determine whether an advertisement is displayable on the same page of the copyright-protected multimedia content.

Figure 2:
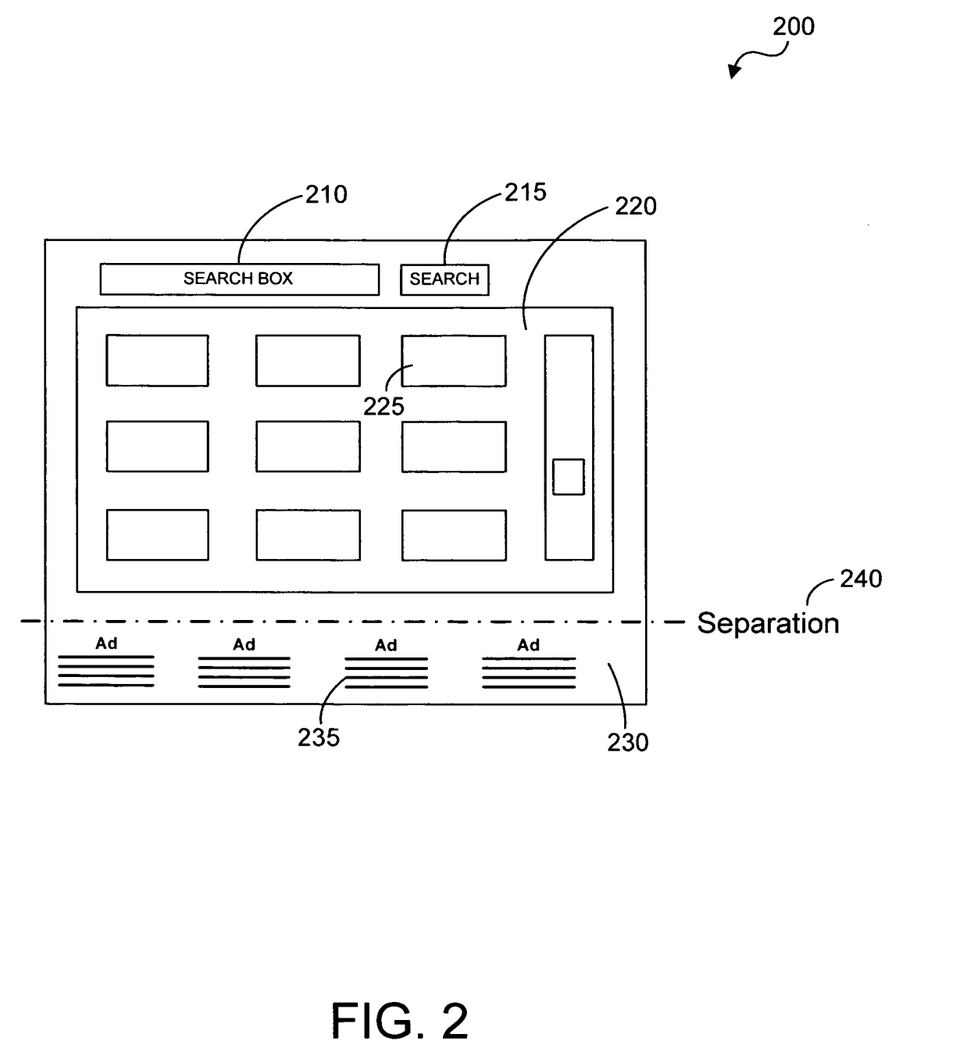
FIG. 2 is a screen shot that illustrates a graphical user interface, according to embodiments of the invention.

FIG. 2 is a screen shot that illustrates a graphical user interface 200, according to embodiments of the invention. The graphical user interface includes a search box 210, a search button 215, a multimedia-content section 220, an advertisement section 230 and blank space separation 240. The search box 210 is utilized by a client to generate multimedia queries. When the search button 215 is depressed, the multimedia query is sent to the server. In an embodiment, the multimedia-content section 220 is populated with thumbnails 225 of multimedia content that matches a multimedia query. The multimedia-content section 220 may include unlicensed copyright-protected multimedia content. Preferably, the server generates advertisement-treatment information to ensure unlicensed copyright-protected multimedia content is utilized according to applicable copyright regulations. In an embodiment, the server may provide the multimedia-content section 220 as a scrollable area that includes only multimedia content that matches the multimedia query. The advertisement section 230 includes advertisements 235 that are associated with terms included in the multimedia query. The blank space separation 240 may include neutral content that appears invisible against the background of the graphical user interface 200. Furthermore, the blank space separation 240 may be adjusted dynamically based on the multimedia content 225 included in the multimedia-content section 220. In an embodiment, the blank space separation spatially separates the unlicensed copyright-protected multimedia content 225 from the advertisements 235. Additionally, position information for the advertisements 235 may be generated after the server determines that the multimedia content 225 includes unlicensed copyright-protected multimedia content. The advertisement section 230 may be above, below, right, or left in relation to the multimedia-content section 220. In an alternate embodiment of the invention, the multimedia-content and advertisement sections 220 and 230 are represented by one scrollable area. The scrollable area may include the blank space separation 240, which allows the unlicensed copyright-protected multimedia content 225 to be displayed above or below the advertisement 235. The size of the blank space separation automatically adjusts based on the multimedia content 225, and a user may utilize a scroll bar to scroll between unlicensed copyright-protected multimedia content 225 and the advertisements 235. In an embodiment, the blank space separation prevents simultaneous display of the unlicensed copyright-protected multimedia content and advertisement information in a display area. For instance, a scrollable display area may contain the unlicensed copyright-protected multimedia content and advertisement information separated by a sizable blank space separation; so when the user scrolls the display area to a point where the unlicensed copyright-protected multimedia content may not be viewed within the display area, the advertisement information associated with the multimedia query populates the display area.

Accordingly, server or client logic may be utilized to add blank space separation to the graphical user interface based on the multimedia content included the multimedia-content section. The blank space separation is content-sensitive physical separation utilized when the multimedia content is gathered based on a crawl of the Internet or when a license is not associated with copyright-protected multimedia content. The logic may optimize the size of the blank space separation to provide a fair use of the unlicensed copyright-protected multimedia content matching the multimedia query.

Additionally, advertisement-treatment information may include temporal information that may be associated with a result set. The temporal information may be utilized to orchestrate transitions between result pages and advertisement pages. Thus, pages having no copyright limitations are generated to display advertisements related to the multimedia query.

Figure 3A:
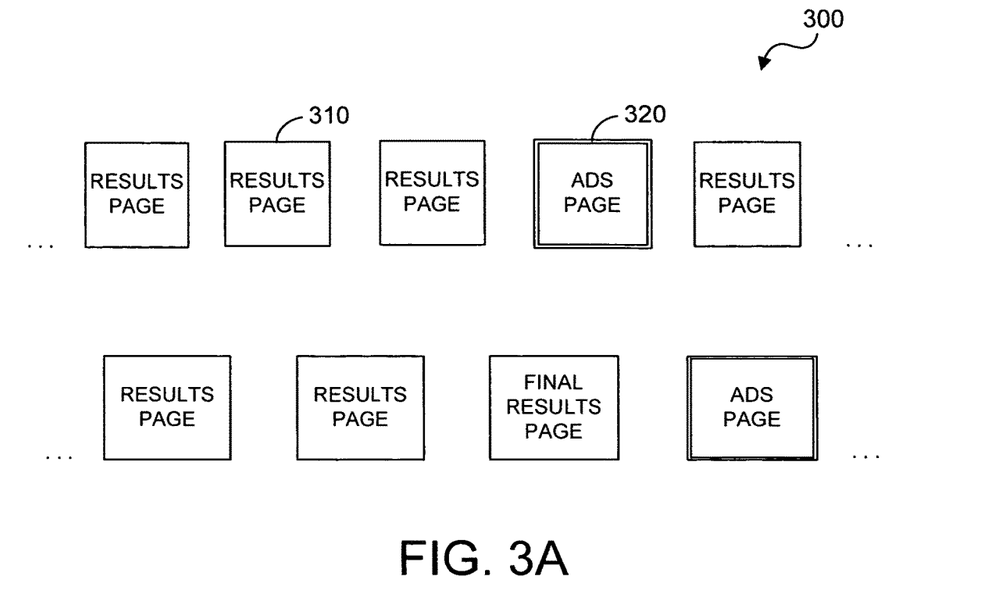
FIG. 3 is a sequence diagram that illustrates the presentation of advertisements, according to an embodiment of the invention.
Figure 3B:
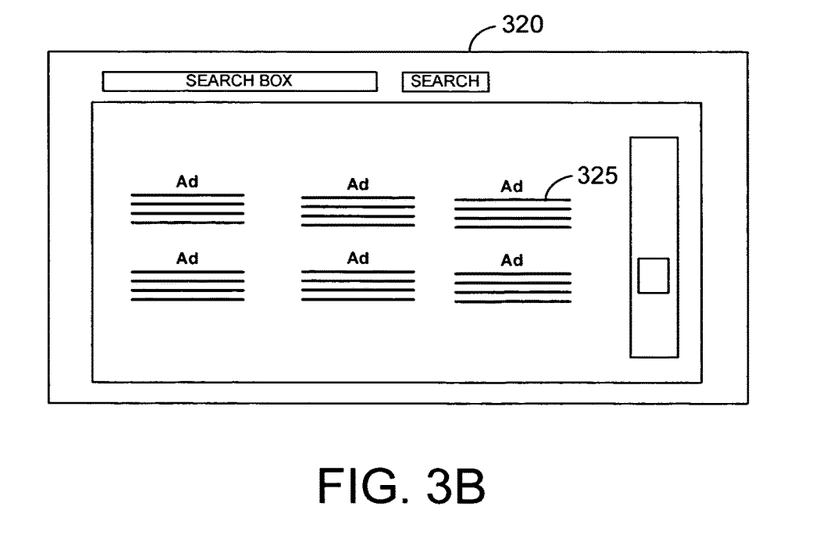

FIG. 3 is a sequence diagram that illustrates the presentation of advertisements, according to an embodiment of the invention. In response to a multimedia query, the server may generate a collection of multimedia content and advertisements. With reference to FIG. 3A, the multimedia content may be transmitted and generated on a plurality of results pages 310 depending the size of the collection. In an embodiment, the result pages may include thumbnails of the multimedia content. The user may transition from a results page 310 to an advertisement page 320 when a request to view more results is received. In an embodiment of the invention, transitions between results and advertisements pages 310 and 320 occur automatically after a specified period of time. With reference to FIG. 3B, the advertisement page 320 may contain advertisements 325 that are associated with terms in the multimedia query. The advertisements 325 displayed are based on payments received from advertisers for terms included in the multimedia query. In an embodiment of the invention, when an advertisers payment for a term is above a specified threshold the advertisements associated with the advertisers are included in the advertisement page 320.

Alternatively, the advertisement page 320 may include premium content (not shown) and the advertisements 325. In an embodiment of the invention, the premium content may include a licensed reproduction, such as a licensed high-resolution reproduction, of copyright-protected multimedia content that matches the multimedia query and an advertisement 325 associated with the multimedia query. Also, the advertisement pages 320 may be interspersed among a collection of result pages 310. The advertisement pages 320 may be located after "n" results page, where "n" is a positive integer. In another embodiment, the final result page 310 can be followed by an advertisement page 320. Accordingly, the last advertisement page 320 may include a collection of advertisements or premium content and advertisements associated with the premium content based on license information associated with the server.

In an embodiment, a server may utilize logic to generate advertisement-treatment information when a result set includes unlicensed copyright-protected multimedia content. The server logic may generate spatial and temporal information that defines the relationship between advertisements and copyright-protected multimedia content. The server may dynamically alter blank space separation to affect the position of advertisements displayed with the unlicensed copyright-protected multimedia content. Alternatively, the logic may utilize transitions to create temporal separation between the advertisement and the copyright-protected multimedia content. The result set generated by the server may include the copyright-protected multimedia content, advertisements and the advertisement-treatment information.

Presentation rules may be utilized by the server logic to determine the appropriate treatment of the advertisements and the multimedia content. The rules may define where the advertisement and multimedia content should be rendered on a client device. The presentation rules may specify whether spatial or temporal separation is needed based on the multimedia content included in the result set. Also, the presentation rules may define whether control elements should be included on a graphical user interface presented to a user. For instance, the presentations rules may specify graphical user interface layouts associated with the multimedia content based on determinations about whether the multimedia content is copyright-protected or licensed. In an embodiment, a user may utilize an advertisement-visibility control include on a graphical user interface to manipulate the display of advertisements associated with a multimedia query.

Figure 4:
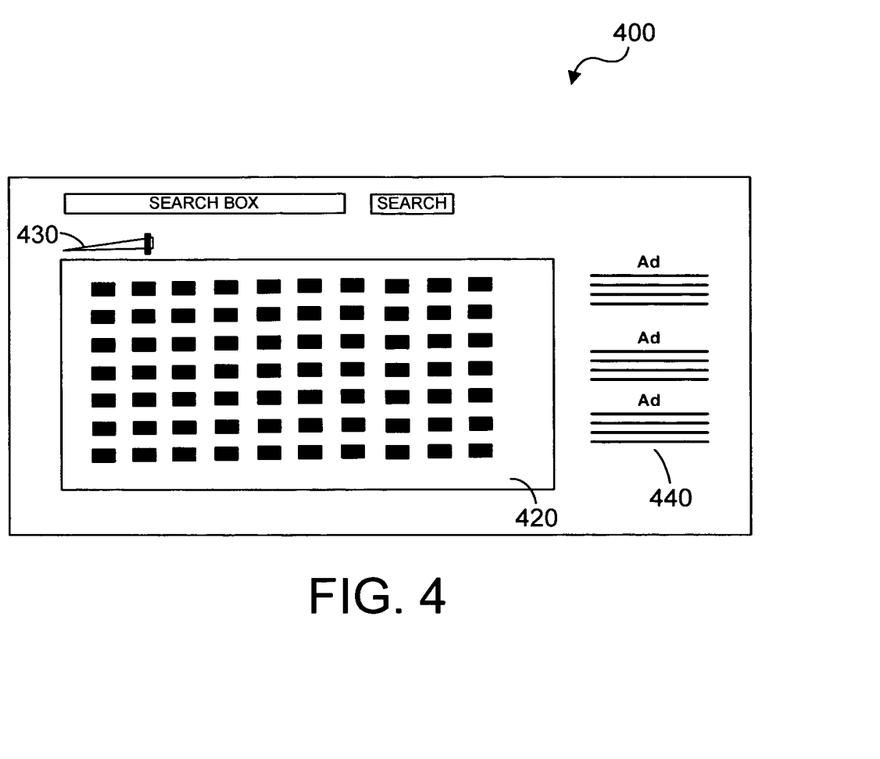
FIG. 4 is a screen shot that illustrates a graphical user interface, according to embodiments of the invention.

FIG. 4 is a screen shot that illustrates a graphical user interface 400, according to embodiments of the invention. The graphical user interface 400 includes copyright-protected multimedia content 420, a visibility control 430 and advertisements 440. In an embodiment, the copyright-protected multimedia content is unlicensed. The visibility control 430 reduces the visibility of the multimedia content 420. When the visibility of the copyright-protected multimedia content 420 is reduced to a predetermined threshold, the advertisements 440 are displayed.

In an embodiment of the invention, the visibility control 430 may be a zoom control or a fuzz control. Zoom control allows the user to alter resolution or magnification associated with the copyright-protected multimedia content 420. Also, the zoom control may be utilized to reduce the size of the copyright-protected multimedia content 420. Thus, when the copyright-protected multimedia content 420 is reduced to the predetermined threshold, the advertisements 440 are displayed. For example, the advertisements 440 are displayed, when the zoom control is utilized to reduce a 9×9 thumbnail to a 3×3. Similarly, the advertisements 440 and thumbnails of copyright-protected multimedia content 420 having a reduced magnification or resolution may be displayed simultaneously, and the zoom control may be utilized to increase the size or resolution of the thumbnails of the copyright-protected multimedia content 420. When the thumbnails of the copyright-protected multimedia content 420 reaches a predetermined size, the advertisements 440 are removed from the display area.

In an alternative embodiment, the visibility control 430 may be a fuzz control that warps or distorts the displayed image of the copyright-protected multimedia content 420, such as by modifying one or more display properties of the multimedia content. The display properties that can be modified include, but are not limited to, a color of the multimedia content, a texture of the multimedia content, a brightness of the multimedia content, or a transparency of the multimedia content. For example, the fuzz control may apply a gray or black layer above copyright-protected multimedia content prior to displaying the advertisement 440. When the fuzz control reaches a predetermined threshold, the advertisements 440 are displayed. Accordingly, the user may utilize the visibility control 430 to affect the visibility of the copyright-protected multimedia content 420 and to display the advertisements 430. Furthermore, the advertisements 440 may be located to the top left, bottom, or right of the copyright-protected multimedia content 420.

In an embodiment of the invention, the advertisement-treatment information includes separation information that is utilized to define the spatial or temporal relationship between the advertisement and the unlicensed copyright-protected multimedia content. The separation information may be generated by a server based on the copyright-protected multimedia content included in the result set associated with a multimedia query.

Figure 5:
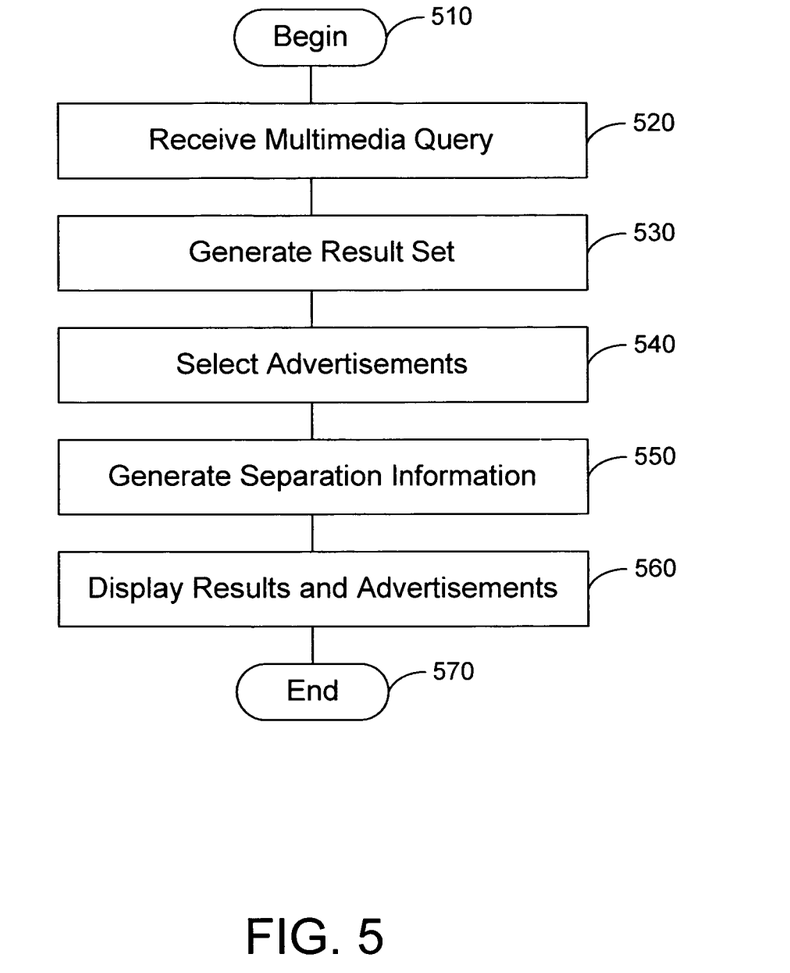
FIG. 5 is a flow diagram that illustrates a method of displaying advertisements and multimedia content, according to an embodiment of the invention.

FIG. 5 is a flow diagram that illustrates a method of displaying advertisements and multimedia content. The method begins in step 510. The server receives a multimedia query in step 520. In response to the multimedia query, the server generates result sets having multimedia content that matches the multimedia query in step 530. In step 540 a group of advertisements associated with terms included in the multimedia query is selected. In step 550 separation information is generated to divide the display area into a copyright area and an advertisement area. The separation information allows unlicensed copyright-protected multimedia content to be displayed with the group of advertisements. The result set including separation and advertisement information is transmitted to a client. In step 560 the client may display the advertisements and multimedia content. The method ends in step 570. Accordingly, the separation information may alter a display layout associated with a client's graphical user interface depending on the unlicensed copyright-protected multimedia content included in the result set.

Premium content included with the result set may be displayed separately or simultaneously with the unlicensed copyright-protected content. The server may be in a contractual relationship with an owner of copyright-protected multimedia content. The owner ensures a quality level associated with the copyright-protected multimedia content. The contract may be a license that grants the server the right to generate or render advertisements contemporaneously with the premium content. The premium content may include high quality multimedia content. The advertisement may be embedded in the premium content or positioned above, below, or on either side of the premium content. The license information associated with premium content may define the relationship between the advertisements and the premium content, such as for example, whether campaign style advertisements are allowed. In an embodiment of the invention, a data structure may include information on rights related to the premium content.

Figure 6:
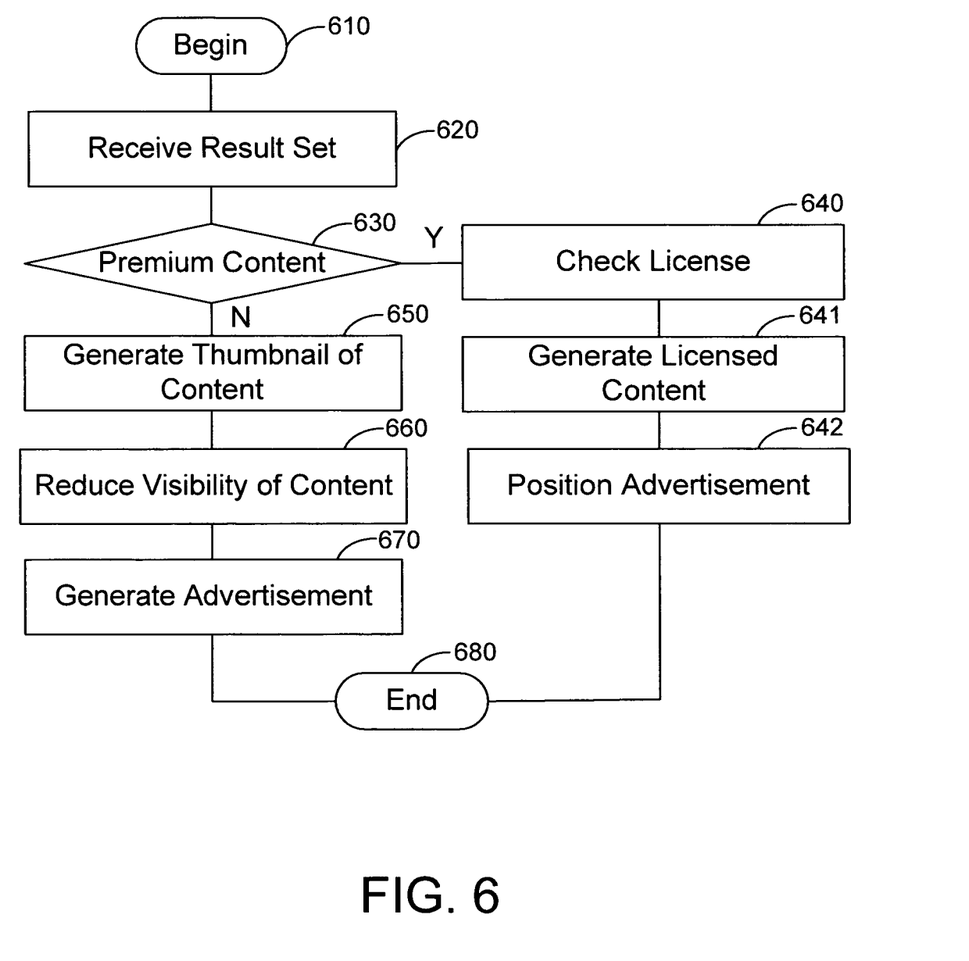
FIG. 6 is a flow diagram that illustrates a method of reducing the visibility of multimedia content prior to displaying advertisements, according to an embodiment of the invention.

FIG. 6 is a flow diagram that illustrates a method of reducing the visibility of multimedia content prior to displaying advertisements.

The method begin is step 610 when the server logic is triggered by a multimedia query. In step 620, a result set is generated in response to the multimedia query. In step 630 the logic determines whether the result set includes premium content that has been licensed. When the result set includes premium content, license information associated with the multimedia content is checked to determine what types of advertisement may be associated with the premium content and where to locate the advertisements. In step 641 a representation of the licensed multimedia content is rendered. In step 642, the advertisements associated with the multimedia query are positioned in relation to the premium content.

When the result set does not include premium content, thumbnails of unlicensed copyright-protected multimedia content are generated in step 650. The visibility of the thumbnails may be automatically reduced to a predetermined threshold in step 660. In step 670 the advertisements associated with the multimedia query are generated and transmitted along with the reduced thumbnails. The method ends in step 680. A client may receive the transmitted information and render the advertisements and multimedia content. In another embodiment of the invention, the premium content and unlicensed, copyright-protected multimedia content may be rendered simultaneously with advertisements.

In an embodiment of the invention, a user interface on a client device can detect the presence of copyright-protected multimedia content in a display area of the user interface. Such a user interface may display advertisements received from the server, for example, when it is detected that the copyrighted information is removed from the viewable display area. Preferably, the detection of when the copyright information is removed from the viewable display area is performed by the user interface. Preferably, the user interface comprises a graphical user interface. Also, the user interface may utilize separation rules to determine when or where to display the advertisement. Accordingly, a client side user interface (or other client side device) may perform logic similar to the server for deciding whether to display advertisements and multimedia content.

Moreover, a third-party provider may communicate with the server to receive results based on a multimedia query received by the third-party provider. The server receives the multimedia query from the third-party provider. In response, the server generates the result set and advertisement-treatment information. The results and advertisement-treatment information are processed by the third-party provider and an appropriate advertisement and multimedia content layout are communicated to the client device. The advertisement-treatment information may include location information associated with the advertisements and multimedia content. Accordingly, the third-party provide may decide whether advertisements should be displayed with the multimedia content included in the result set.

In sum, search providers may generate result sets that include advertisements, which may be displayed with copyrighted material, in response to multimedia queries received by the search provider. The search providers determine whether the multimedia content included in the search result may be rendered with advertisements. When the multimedia content prohibits rendering of the advertisement, the multimedia content in the results are obscured through spatial or temporal separation from the advertisement or quality reduction of the multimedia content.

In an alternate embodiment of the invention, the search provider generates advertisement-treatment information that informs a third-party provider where to locate an advertisement in relation to multimedia content. The third-party provider may receive multimedia queries that are processed by the search provider, which transmits the advertisement treatment information to the third-party provider in response to the multimedia query. The advertisement treatment information may be packaged in a data structure that includes advertisement position, a result set including multimedia content, and multimedia content visibility.

The foregoing descriptions of the invention are illustrative, and modifications in configuration and implementation will occur to persons skilled in the art. For instance, while the present invention has generally been described with relation to FIGS. 1-6, those descriptions are exemplary. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the invention is accordingly intended to be limited only by the following claims.

We claim:

1. A computer-implemented method employing a server device, the method comprising:
   receiving, at the server device, a query associated with multimedia content comprising unlicensed copyright-protected content;
   selecting, at the server device, advertisement information based on terms included in the query;
   generating advertisement-treatment information for the advertisement information based on terms included in the query, the generating comprising:
      determining that the multimedia content comprises unlicensed copyright-protected content; and
      generating the advertisement-treatment information in response to the determining, the advertisement-treatment information indicating how the advertisement information is displayed with relation to the unlicensed copyright-protected content, the advertisement-treatment information defining spatial or temporal relationships between the advertisement information and the unlicensed copyright-protected content corresponding to the query; and
   transmitting a results set generated from the query comprising the multimedia content, the results set to be displayed as one or more thumbnails corresponding to the multimedia content in a multimedia-content section associated with a display area with the selected displayed advertisement information being displayed in an advertisement section associated with the display area according to the advertisement-treatment information, an advertisement-visibility control modifying display properties of the unlicensed copyright-protected content to obscure the unlicensed copyright-protected content when displaying the advertisements in the advertisement section based on the advertisement-treatment information and removing the advertisement information when the unlicensed copyright-protected content becomes visible in the display area based on the advertisement-treatment information.

2. The method according to claim 1, wherein the selected advertisement information is associated with an advertiser whose payment is above a specified payment threshold.

3. The method according to claim 1, wherein the method further comprises:
   embedding or superimposing the advertisement information on licensed copyright-protected multimedia content.

4. The method according to claim 1, wherein the multimedia content is image, audio, or video.

5. The method according to claim 4, wherein the multimedia content includes premium content.

6. A method to generate a graphical user interface to provide multimedia content in response to a multimedia query, comprising:
   displaying, in a multimedia-content section, one or more thumbnails corresponding to multimedia content matching the multimedia query, the multimedia content comprising unlicensed copyright-protected content;
   displaying an advertisement-visibility control for obscuring the one or more thumbnails, the advertisement-visibility control modifying display properties of the unlicensed copyright-protected content;
   receiving advertisement-treatment information for advertisements based on terms included in the query, the advertisement-treatment information indicating how advertisements are displayed with relation to unlicensed copyright-protected content, the advertisement-treatment information defining spatial or temporal relationships between the advertisements and the unlicensed copyright-protected content corresponding to the multimedia query;
   displaying, in an advertisement section, the advertisements based on terms included in the query, the advertisement section being spatially separated from the multimedia-content section and the unlicensed copyright-protected content being obscured when displaying the advertisements in the advertisement section based on the advertisement-treatment information; and
   removing the advertisements when obscuring of the unlicensed copyright-protected content is below a predetermined threshold.

7. The method of claim 6, wherein the advertisements are located below the thumbnails of the multimedia content.

8. The method of claim 6, wherein the advertisements are located apart from the multimedia content by a scrollable area.

9. The method of claim 8, wherein the scrollable area adjusts based upon the advertisement-treatment information.

10. The method of claim 6, further comprising:
a blank space separation between the advertisement section and multimedia-content section, wherein a size of the blank space separation is based on content in the one or more sources.

11. The method of claim 6, wherein the visibility adjuster comprises a zoom selector, which allows the user to reduce the size of thumbnails associated with the multimedia content.

12. The method of claim 6, wherein the visibility adjuster comprises a fuzz selector, that warps the thumbnails associated with the multimedia content.

13. A system for providing multimedia content on a client device in response to a multimedia query, the system comprising:
a sending component configured to send a multimedia query;
a receiving component configured to receive:
advertisement information matching terms in the multimedia query,
one or more thumbnails corresponding to multimedia content matching the multimedia query, the multimedia content comprising unlicensed copyright-protected content, and
advertisement-treatment information for advertisements based on terms included in the query, the advertisement treatment information indicating how the advertisement information is displayed with relation to unlicensed copyright-protected content, the advertisement-treatment information defining spatial or temporal relationships between the advertisement information and the unlicensed copyright-protected content corresponding to the multimedia query;
a formatting component configured to format the received advertisement information and the unlicensed copyright-protected content for display on the client device based on the advertisement-treatment information, the unlicensed copyright-protected content being displayed in a multimedia-content section on the client device; and
an advertisement-visibility control for the one or more thumbnails, the advertisement-visibility control modifying display properties of the unlicensed copyright-protected content to obscure the unlicensed copyright-protected content when displaying the advertisement information in an advertisement section and removing the advertisement information when obscuring of the unlicensed copyright-protected content is below a predetermined threshold based on the advertisement-treatment information, the advertisement section being spatially separated from the multimedia-content section based on the advertisement-treatment information.

14. The method according to claim 1, further comprising:
retrieving license information associated with licensed copyright-protected content, the license information indicating where advertisement information is to be displayed in relation to the licensed copyright-protected multimedia content.

15. The method according to claim 1, wherein the advertisement-treatment information comprises rules for unlicensed copyright-protected multimedia content regarding copyright regulations for copyright-protected multimedia.

16. The method of claim 6, wherein the displaying the advertisement section is performed after removing the copyright-protected content from a viewable display area of the graphical user interface.

17. The method of claim 12, wherein the fuzz selector modifies one or more display properties of the multimedia content, the display properties comprising one or more of a color of the multimedia content, a texture of the multimedia content, a brightness of the multimedia content, or a transparency of the multimedia content.

18. The system of claim 13, wherein obscuring the unlicensed copyright-protected content comprises adjusting at least one of a color of the unlicensed copyright-protected content, a texture of the unlicensed copyright-protected content, a brightness of the unlicensed copyright-protected content, or a transparency of the unlicensed copyright-protected content.

19. The method of claim 1, wherein the display area is a scrollable area, and wherein the advertising information becomes visible in the display area when the unlicensed copyright-protected content is scrolled off of the display area.

20. The system of claim 13, wherein the displaying the advertisement section is performed after removing the copyright-protected content from a viewable display area of the graphical user interface.

* * * * *